(12) United States Patent
Griffin

(10) Patent No.: US 8,196,981 B1
(45) Date of Patent: Jun. 12, 2012

(54) COMPACT DISC RETRIEVING DEVICE

(76) Inventor: Albert Griffin, Rock Hill, SC (US)

( * ) Notice: Subject to any disclaimer, the term of this patent is extended or adjusted under 35 U.S.C. 154(b) by 0 days.

(21) Appl. No.: 12/912,224

(22) Filed: Oct. 26, 2010

Related U.S. Application Data

(60) Provisional application No. 61/259,998, filed on Nov. 10, 2009.

(51) Int. Cl.
*B25B 7/00* (2006.01)
(52) U.S. Cl. ............................. 294/3; 294/118; 294/219
(58) Field of Classification Search ................. 294/2, 3, 294/16, 26, 28, 33, 118, 169, 173, 187, 219
See application file for complete search history.

(56) References Cited

U.S. PATENT DOCUMENTS

| | | | |
|---|---|---|---|
| 1,643,456 A * | 9/1927 | James ............................. 30/324 |
| 2,559,978 A * | 7/1951 | Marco ............................. 294/28 |
| 3,282,589 A | 11/1966 | Morrison |
| 3,636,954 A * | 1/1972 | Weston .......................... 606/208 |
| 3,961,819 A | 6/1976 | Yocum |
| 4,417,757 A | 11/1983 | Morrison |
| 4,662,667 A | 5/1987 | Gilligan et al. |
| 4,997,224 A | 3/1991 | Pierce |
| 5,192,106 A | 3/1993 | Kaufman |
| 5,201,913 A * | 4/1993 | Vliet .............................. 294/187 |
| 5,713,618 A | 2/1998 | Kocsis |
| 6,260,897 B1 * | 7/2001 | Carano ........................... 294/26 |
| 6,530,612 B2 | 3/2003 | Bell |
| 2005/0046208 A1 * | 3/2005 | Tatta ............................... 294/1.1 |

* cited by examiner

*Primary Examiner* — Saul Rodriguez
*Assistant Examiner* — Gabriela Puig
(74) *Attorney, Agent, or Firm* — P. Jeff Martin; The Law Firm of P. Jeffrey Martin, LLC

(57) ABSTRACT

A compact disc retrieving device which allows for the quick, easy, and efficient removal of a CD or DVD from a CD or DVD player without damaging the CD or DVD player and without marring, scratching, deforming or otherwise causing damage to the CD or DVD. The device includes a first arm pivotally coupled to a second arm. The device further includes a third arm coupled to the first arm. The third arm includes a suction cup attached thereto.

7 Claims, 4 Drawing Sheets

COMPACT DISC RETRIEVING DEVICE

RELATED APPLICATIONS

This application claims the benefit of U.S. Provisional Application No. 61/259,998 filed on Nov. 10, 2009.

BACKGROUND OF THE INVENTION

1. Field of the Invention

The present invention relates generally to accessories for compact disc players and, more particularly, to a compact disc retrieving device.

2. Description of the Related Art

One of the most common mechanical malfunctions associated with compact disc or digital video disc players is the lodging or jamming by the compact disc or digital video disc inside the player.

While the prior art discloses various devices for handling compact discs and digital video discs, it is silent regarding a compact disc removal device for effectively removing a compact disc without damaging the compact disc player, and without marring, scratching, deforming or otherwise causing damage to the compact disc.

Accordingly, a need exists for a device configured to allow for the quick, easy, and efficient removal of a compact disc (CD) or digital video disc (DVD) from a CD or DVD player without damaging the CD or DVD player and without marring, scratching, deforming or otherwise causing damage to the CD or DVD. The development of the compact disc retrieving device fulfills this need.

A search of the prior art did not disclose any patents that read directly on the claims of the instant invention; however, the following references were considered related.

U.S. Pat. No. 6,530,612 B2, issued in the name of Bell;
U.S. Pat. No. 5,713,618, issued in the name of Kocsis;
U.S. Pat. No. 5,192,106, issued in the name of Kaufman;
U.S. Pat. No. 4,997,224, issued in the name of Pierce;
U.S. Pat. No. 4,417,757, issued in the name of Morrison;
U.S. Pat. No. 3,961,819, issued in the name of Yocum;
U.S. Pat. No. 4,662,667, issued in the name of Gilligan et al.; and
U.S. Pat. No. 3,282,589, issued in the name of Morrison.

Consequently, a need has been felt for a compact disc retrieving device. This application presents claims and embodiments that fulfill a need or needs not yet satisfied by the products, inventions and methods previously or presently available. In particular, the claims and embodiments disclosed herein describe a compact disc retrieving device comprising: a first arm having an upper end opposing a lower end; a second arm having an upper end opposing a lower end, the first arm is pivotally coupled to the second arm via a fastener; a first rubber jacket covering the lower end of the first arm; and a second rubber jacket covering the lower end of the second arm, the device of the present invention providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

Briefly described according to one embodiment of the present invention, a compact disc retrieving device is disclosed, wherein the device comprises a first arm pivotally coupled to a second arm. The first arm and the second arm each respectively comprise an upper end opposing a lower end. The upper end of each arm includes finger engaging apertures for pivoting the arms. The lower end of each arm is formed into a tip fitted with a rubber jacket.

An alternate embodiment is disclosed wherein the device of the present invention includes a fastener disposed with a spring, the spring having a first end connected to the first arm of the device and a second end connected to the second arm of the device. The spring maintains the first and second arms in a closed, resting position.

A second alternate embodiment is disclosed wherein the device of the present invention includes a first arm defining a downward, incurvate forward portion.

A third alternate embodiment is disclosed wherein the device of the present invention includes a supplemental arm pivotally coupled to the first arm.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
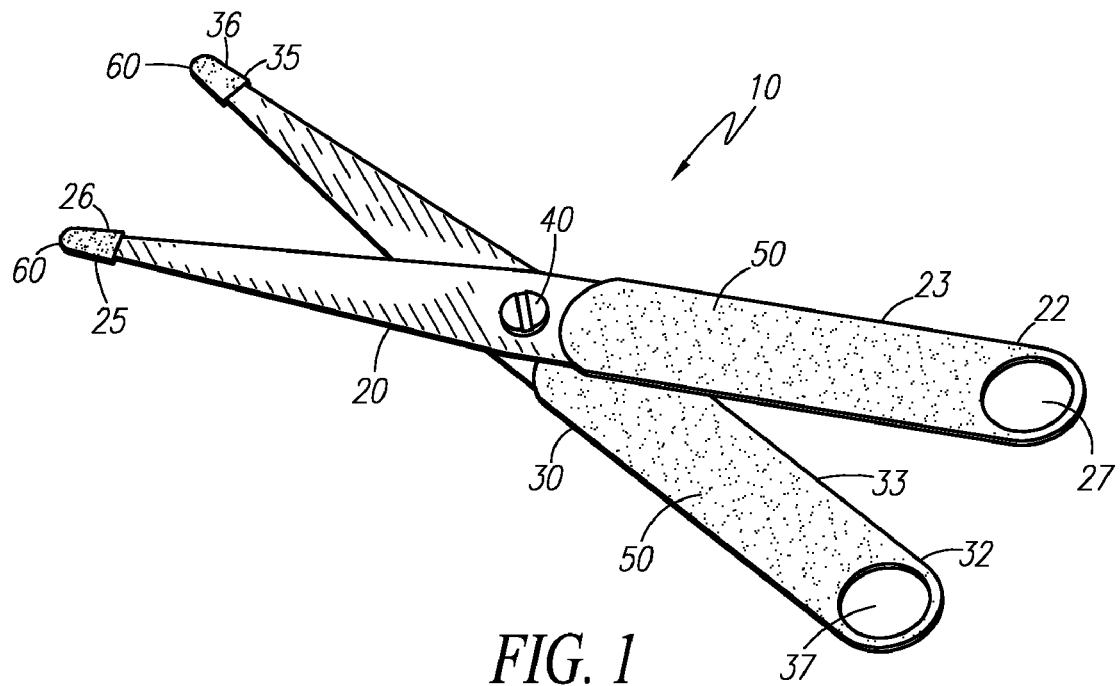
FIG. 1 is a perspective view of a compact disc retrieving device, according to the preferred embodiment of the present invention.

Referring now to FIGS. 1-4, a compact disc retrieving device 10 is shown, according to one embodiment of the present invention. The compact disc retrieving device 10, hereinafter referred to as "retrieving device 10", is configured to allow for the quick, easy, and efficient removal of a compact disc (CD) or digital video disc (DVD) 70 from a CD or DVD player 80 without damaging the CD or DVD player 80 and without marring, scratching, deforming or otherwise causing damage to the CD or DVD 70.

The retrieving device 10 comprises a first arm 20 pivotally coupled to a second arm 30 via a suitable fastener 40. The first arm 20 and second arm 30 are separated by a vertical distance measuring proximate a thickness of a CD or DVD 70. The first arm 20 and the second arm 30 each define an elongated, thin planar configuration. The first arm 20 and second arm 30 are constructed of a rigid material. Preferred construction materials may be selected from the group comprising plastic, thermoplastic, metal or a metallic-plastic composite. Preferred plastic or thermoplastic materials include polyvinyl chloride (PVC), polypropylene, polyolefin, acrylonitrile-butadiene-styrene (ABS), polyethylene, polyurethane, polycarbonate, or blends thereof, and ABS/Nylon blend.

The first arm 20 and the second arm 30 each respectively comprise an upper end 22, 32 defined as a handle portion 23, 33, opposing a lower end 25, 35 defined as a tip portion 26, 36. The first arm 20 and second arm 30 taper from proximally a respective mid-region 29, 39 of each arm 20, 30 to a respective tip 26, 36 thereof.

The upper end 22 of the first arm 20 includes an aperture 27 defined therethrough for receiving a finger (not shown), typically an index finger.

The first arm 20 may be enveloped with a sleeve member 50 extending longitudinally from the upper end 22 thereof and terminating proximal to fastener 40.

Figure 2:
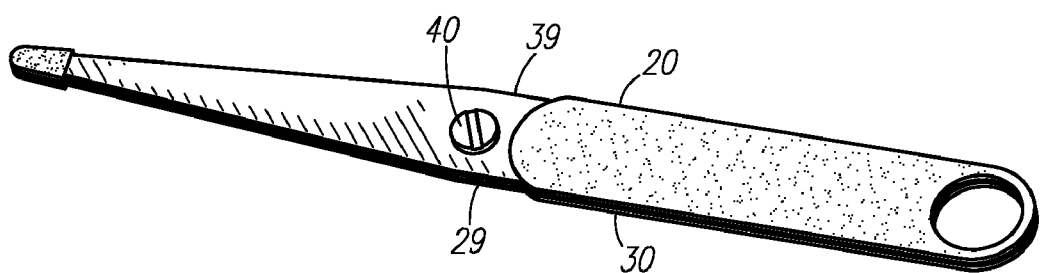
FIG. 2 is a perspective view of the compact disc retrieving device of FIG. 1, shown in a closed position.
Figure 3:
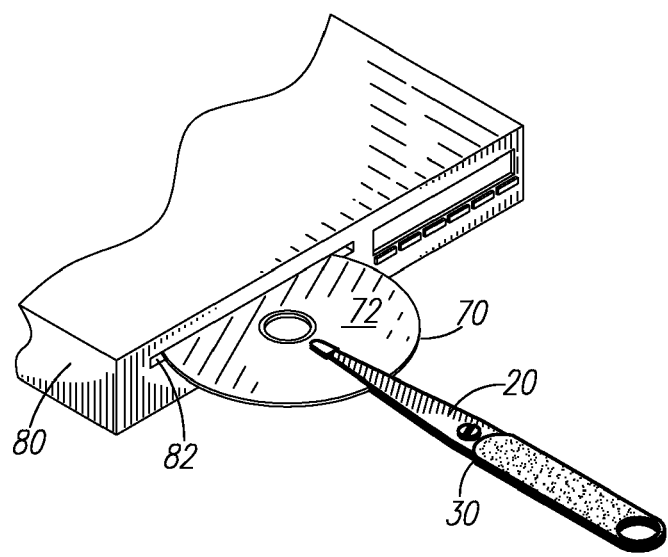
FIG. 3 is a perspective view of the compact disc retrieving device illustrating removal of a CD or DVD from a CD or DVD player, according to one embodiment of the present invention.
Figure 4:
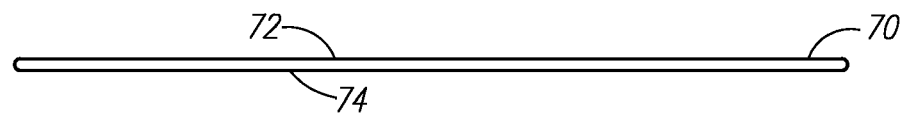
FIG. 4 is a side elevational view of a CD or DVD.

The upper end 32 second arm 30 includes an aperture 37 defined therethrough for receiving a finger, typically a thumb (not shown). Thus, aperture 27 of first arm 20 and aperture 37 of second arm 30 permit manual pivoting of the retrieving device 10 from an open (FIG. 1) to a closed position (FIG. 2).

In addition, like the first arm 20, the second arm 30 may be enveloped with an identical sleeve member 50 extending longitudinally from the upper end 32 of second arm 30 and terminating proximal to fastener 40. Sleeve member 50 is envisioned to be constructed of a soft rubber or similar material for enhancing grip of arms 20 and 30 by fingers of operator.

The tip portion 26, 36 of each the first arm 20 and second arm 30, respectively, is fitted with a rubber jacket 60 to facilitate grip by tip portions 26, 36 with an upper surface 72 and a lower surface 74 of a CD or DVD 70.

Figure 5:
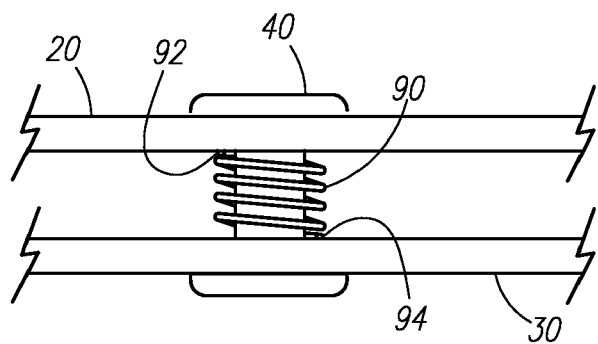
FIG. 5 is a partial cross-sectional view of the first arm and second arm shown biased by a spring, according to a first alternate embodiment of the present invention.

Referring now to FIG. 5, according to another embodiment of the present invention, fastener 40 may include a spring 90 having a first end 92 connected to first arm 20 and a second end 94 connected to second arm 30. The spring 90 biases arms 20 and 30 in a closed, resting position, as shown in FIG. 2.

Figure 6:
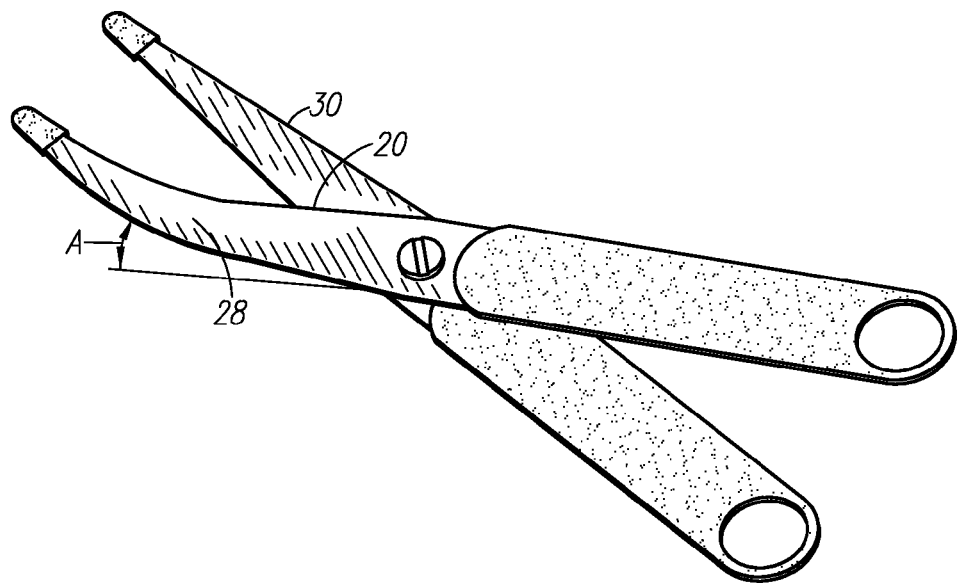
FIG. 6 is a perspective view of a compact disc retrieving device illustrating the incurvate forward portion of the first arm thereof, according to a second alternate embodiment of the present invention.

In reference to FIG. 6, according to still another embodiment of the present invention, first arm 20 defines a downward, incurvate forward portion 28 at acute angle "A". The forward portion 28 of first arm 20 is bent inward and downward at angle A so as to enhance impingement capability and strength of tip portions 26, 36 with an upper surface 72 and a lower surface 74 of a CD or DVD 70.

Figure 7:
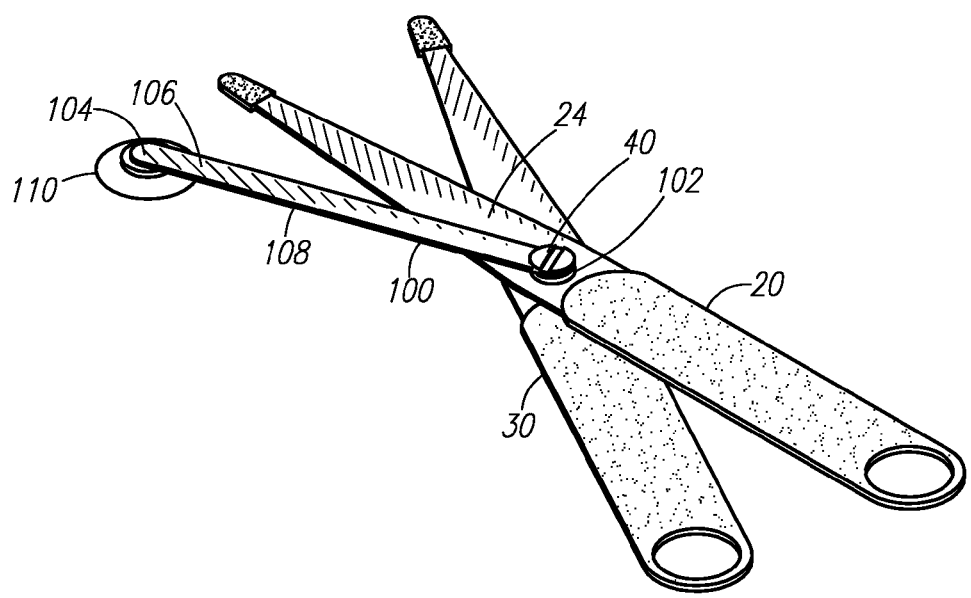
FIG. 7 is perspective view of a compact disc retrieving device, according to a third alternate embodiment of the present invention.
Figure 8:
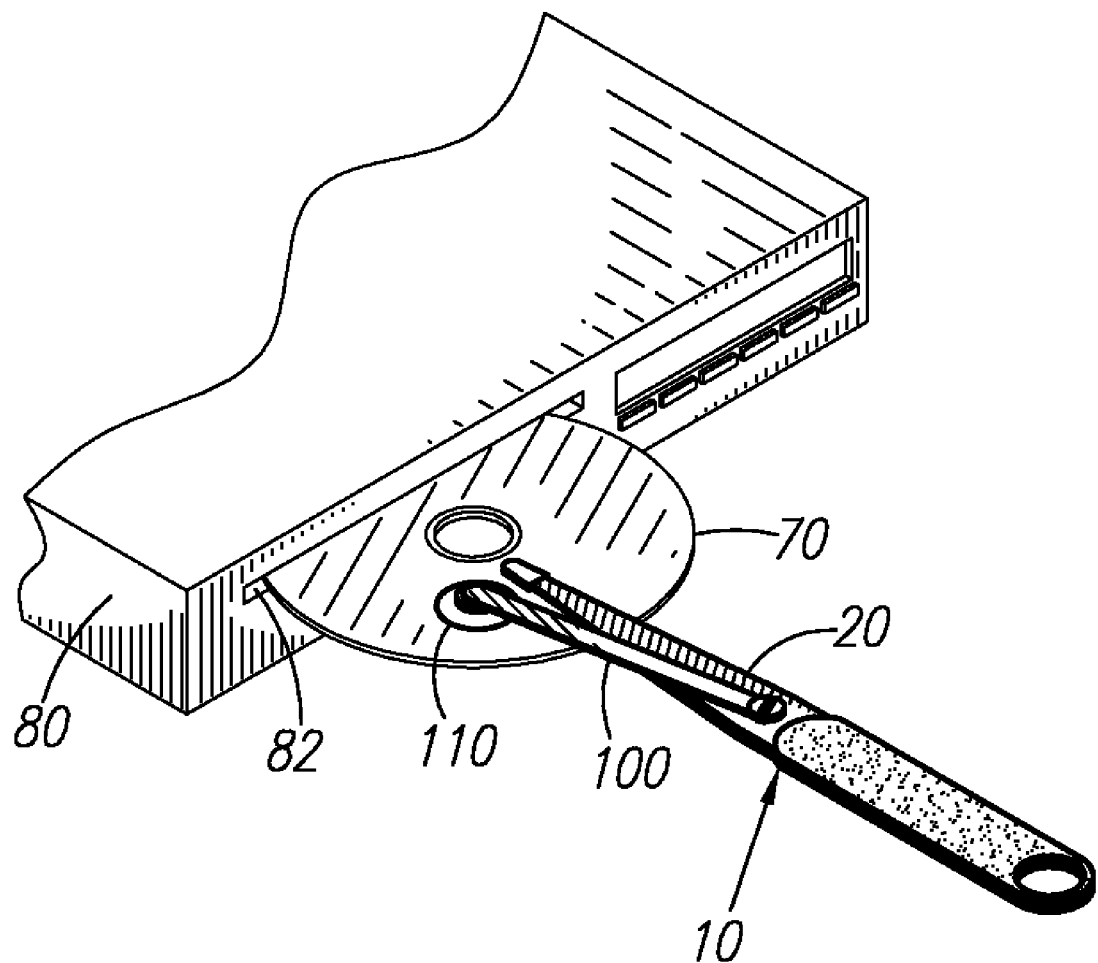
FIG. 8 is perspective view of the embodiment of FIG. 7 illustrating removal of a CD or DVD from a CD or DVD player.

Referring now to FIGS. 7-8, according to yet another embodiment of the present invention, a third arm or supplemental arm 100 is provided. The supplemental arm 100 defines an elongated, thin planar configuration having a longitudinal length measuring less than half a longitudinal measure defining the first arm 20 and the second arm 30. The supplemental arm 100 is constructed of a rigid material, the selected material preferably being the same construction material selected for the first arm 20 and second arm 30.

The supplemental arm 100 is pivotally coupled to the first arm 20 atop an upper surface 24 thereof, via the fastener 40. Supplemental arm 100 comprises an upper end 102 opposing a lower end 104, and an upper surface 106 and a lower surface 108.

Supplemental arm 100 further comprises a suction cup 110 suitably affixed to the lower surface 108 of supplemental arm 100, at the lower end 104 thereof. The suction cup 110 provides an additional means for firmly gripping a CD or DVD 70 to assist in the removal thereof from a CD or DVD player 80.

It is envisioned supplemental arm 100 may be fixedly attached to the first arm 20 atop an upper surface 24 thereof, so as to be positioned at an acute angle with respect to first arm 20.

In order to remove a lodged CD or DVD 70 from a CD or DVD player 80, user inserts user's index finger through the aperture 27 of the first arm 20 and inserts user's thumb (not shown) through the aperture 37 of the second arm 30. User pivots the arms 20 and 30 to a slightly open position, and inserts the tip portions 26 and 36 of the first and second arms 20, 30 into a CD or DVD receiving opening 82 for the CD or DVD player 80 until the tip portions 26, 36 engage an upper surface 72 and a lower surface 74 of the CD or DVD 70. User next pivots the arms 20 and 30 to a closed position, thereby gripping and holding the CD or DVD 70 between the tip portions 26, 36 in a secure manner. Finally, user pulls or withdrawals the retrieving device 10 from the CD or DVD receiving opening 82, thereby removing the CD or DVD 70 from the CD or DVD player 80. In some instances, it may be necessary for user to slightly jostle or apply a rocking motion when removing a CD or DVD 70 from the CD or DVD player 80.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A compact disc retrieving device, the device comprising:
 a first arm having an upper end opposing a lower end;
 a second arm having an upper end opposing a lower end, the first arm is pivotally coupled to the second arm via a fastener, the first arm and the second arm are separated by a vertical distance measuring proximate a thickness of a CD or DVD, the first arm and the second arm each define an elongated, thin planar configuration, the first arm and the second arm each comprise an upper end defined as a handle portion, opposing a lower end defined as a tip portion, the first arm and the second arm each taper from proximally a mid-region thereof to the respective tip portion of each the first arm and the second arm, the upper end of the first arm includes an aperture defined therethrough for receiving a finger, and the upper end of the second arm includes an aperture defined therethrough for receiving a finger;

a first rubber jacket covering the lower end of the first arm;

a second rubber jacket covering the lower end of the second arm; and a third arm, the third arm defines an elongated, thin planar configuration having a longitudinal length measuring less than half a longitudinal measure defining the first arm and the second arm.

2. The device of claim 1, wherein the third arm is coupled or pivotally coupled to the first arm atop an upper surface thereof via the fastener, the third arm comprises an upper end opposing a lower end, and an upper surface and a lower surface.

3. The device of claim 2, wherein the third arm comprises a suction cup suitably affixed to the lower surface of the third arm, at the lower end thereof.

4. The device of claim 1, wherein the first arm, the second arm, and the third arm are constructed of a rigid material.

5. The device of claim 1, wherein each the first arm and the second arm is enveloped with a sleeve member extending longitudinally from the upper end, respectively, thereof and terminating proximal to the fastener.

6. The device of claim 5, wherein the sleeve member is constructed of a soft rubber material for enhancing a grip of the first arm and the second arm by the fingers of an operator.

7. The device of claim 1, wherein the tip portion of each the first arm and the second arm is fitted with a rubber jacket to facilitate grip by the tip portions with an upper surface and a lower surface of a CD or DVD.

* * * * *